(12) United States Patent
Morioka et al.

(10) Patent No.: US 8,792,413 B2
(45) Date of Patent: Jul. 29, 2014

(54) RELAY STATION, BASE STATION, RADIO COMMUNICATION SYSTEM, AND METHOD

(75) Inventors: Yasufumi Morioka, Tokyo (JP); Akira Yamada, Tokyo (JP); Hideaki Takahashi, Tokyo (JP); Mikio Iwamura, Tokyo (JP); Junichiro Hagiwara, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/877,871

(22) PCT Filed: Sep. 21, 2011

(86) PCT No.: PCT/JP2011/071471
§ 371 (c)(1),
(2), (4) Date: Apr. 4, 2013

(87) PCT Pub. No.: WO2012/046573
PCT Pub. Date: Apr. 12, 2012

(65) Prior Publication Data
US 2013/0208652 A1  Aug. 15, 2013

(30) Foreign Application Priority Data
Oct. 6, 2010  (JP) .................................. 2010-226798

(51) Int. Cl.
*H04W 4/00*  (2009.01)
(52) U.S. Cl.
USPC ............................. 370/315; 370/329; 370/341
(58) Field of Classification Search
None
See application file for complete search history.

(56) References Cited

U.S. PATENT DOCUMENTS

| 8,259,659 | B2 * | 9/2012 | Luft et al. | 370/329 |
| 8,281,211 | B2 * | 10/2012 | Wang et al. | 714/755 |
| 8,422,049 | B2 * | 4/2013 | Takashima | 358/1.14 |
| 2006/0045083 | A1 * | 3/2006 | Hasty et al. | 370/389 |
| 2008/0013519 | A1 * | 1/2008 | Kwon et al. | 370/345 |

OTHER PUBLICATIONS

International Search Report issued in PCT/JP2011/071471 mailed Dec. 20, 2011 (4 pages).
Japanese Office Action for Application No. 2010-226798, mailed on Dec. 20, 2011 (5 pages).
ZTE, "Consideration on MME selection for Relay", 3GPP TSG RAN WG2 #71; R2-104843; Madrid, Spain; Aug. 23-27, 2010 (2 pages).
Huawei, Catt, "On the Selection of RN's MME", 3GPP TSG-RAN WG2 Meeting #70bis; R2-103707; Stockholm, Sweden; Jun. 28-Jul. 2, 2010 (3 pages).
NTT Docomo, Inc., "RN indication for MME selection", 3GPP TSG-RAN WG2 #71bis; R2-105831; Xi'an, China; Oct. 11-15, 2010 (2 pages).
3GPP TR 36.806 V9.0.0; "3rd Generation Partnership Project; Technical Specification Group Radio Access Network; Evolved Universal Terrestrial Radio Access (E-UTRA); Relay architectures for E-UTRA (LTE-Advanced) (Release 9)"; Mar. 2010 (34 pages).
Written Opinion issued in PCT/JP2011/071471 mailed Dec. 20, 2011 (3 pages).

* cited by examiner

*Primary Examiner* — Chi Pham
*Assistant Examiner* — Soon-Dong D Hyun
(74) *Attorney, Agent, or Firm* — Osha Liang LLP

(57) ABSTRACT

A relay station for relaying a radio signal between a mobile station and a base station includes a relay station information generating unit configured to generate relay station information used by the base station to select a switching center to be connected to the relay station. The relay station also includes a message generating unit configured to generate a message including the relay station information generated by the relay station information generating unit, and a transmitting unit configured to transmit the message generated by the message generating unit to the base station.

8 Claims, 8 Drawing Sheets

RELAY STATION, BASE STATION, RADIO COMMUNICATION SYSTEM, AND METHOD

BACKGROUND OF INVENTION

1. Technical Field

The present invention relates to a radio communication system.

2. Background Art

As a radio access method for next-generation radio communication systems, LTE-Advanced is being standardized to implement higher-speed, higher-volume communications.

For LTE-Advanced, it is being discussed to introduce a relay technology for regenerative relaying of radio signals between a base station and a mobile station at the layer 3 level.

RELATED-ART DOCUMENTS

Non-Patent Document

[Non-patent document 1] TR36.806 V9.0.0 (4.2.1.1 Relationship among alternatives in architecture A) 2010 03

SUMMARY OF INVENTION

FIG. 1 is a drawing used to provide an overview of a relay technology.

In FIG. 1, a relay station 20 includes functions corresponding to those of a base station 30. The relay station 20 demodulates and decodes user data, performs predetermined processing on the user data, and then encodes and modulates the user data. The relay station 20 has a cell ID at the physical layer (physical cell ID: PCI) that is different from the PCI of the base station 30. Accordingly, a mobile device 10 identifies a cell provided by the relay station 20 as a different cell from that provided by the base station 30. The relay station 20 includes a protocol that includes necessary functions defined in LTE for communications between the base station 30 and a switching center 40.

When the relay 20 is introduced, it is possible that some switching centers support (i.e., are compatible with) the relay 20 and other switching centers do not support (i.e., are incompatible with) the relay 20. Here, a relay station needs to be connected to a switching center that supports the relay station.

However, when a base station performs a connection process with a switching center in response to a connection request signal, the base station cannot determine whether the connection request signal is sent from a mobile device or a relay station. Since the base station cannot determine whether the connection request signal is sent from a mobile device or a relay station, the base station also cannot determine whether to select a switching center supporting the relay station or a switching center not supporting the relay station.

One or more embodiments of the present invention may enable selection of a switching center to which a relay station is to be connected.

In an aspect of this disclosure, there is provided a radio communication system including a base station and a relay station configured to relay a radio signal between the base station and a mobile station. The relay station includes a relay station information generating unit configured to generate relay station information used by the base station to select a switching center to be connected to the relay station; a message generating unit configured to generate a message including the relay station information generated by the relay station information generating unit; and a transmitting unit configured to transmit the message generated by the message generating unit to the base station. The base station includes a receiving unit configured to receive a wirelessly-transmitted message; a relay station information determining unit configured to determine whether the message received by the receiving unit includes the relay station information; a switching center selecting unit configured to select the switching center to be connected to the relay station from switching centers that are compatible with the relay station when the relay station information determining unit determines that the message includes the relay station information; and a connection processing unit configured to connect the switching center selected by the switching center selecting unit to the relay station.

An aspect of this disclosure makes it possible to select a switching center to which a relay station is to be connected.

DETAILED DESCRIPTION

Embodiments of the present invention are described below with reference to the accompanying drawings.

Throughout the accompanying drawings, the same reference numbers are used for components having the same functions, and overlapping descriptions of those components are omitted.

<<Embodiments>>
<System>

An environment where a relay station and a base station according to the present embodiment are used is described below.

A relay station and a base station according to the present embodiment may be used in an environment including plural mobile communication systems. The mobile communication systems may include an LTE-Advanced system (LTE Rel. 10 and beyond).

An area covered by a base station includes one or more cells. The cells may include a group of cells where radio communications can be performed in the same frequency band. The group of cells where radio communications can be performed in the same frequency band may be referred to as a frequency layer.

Figure 1:
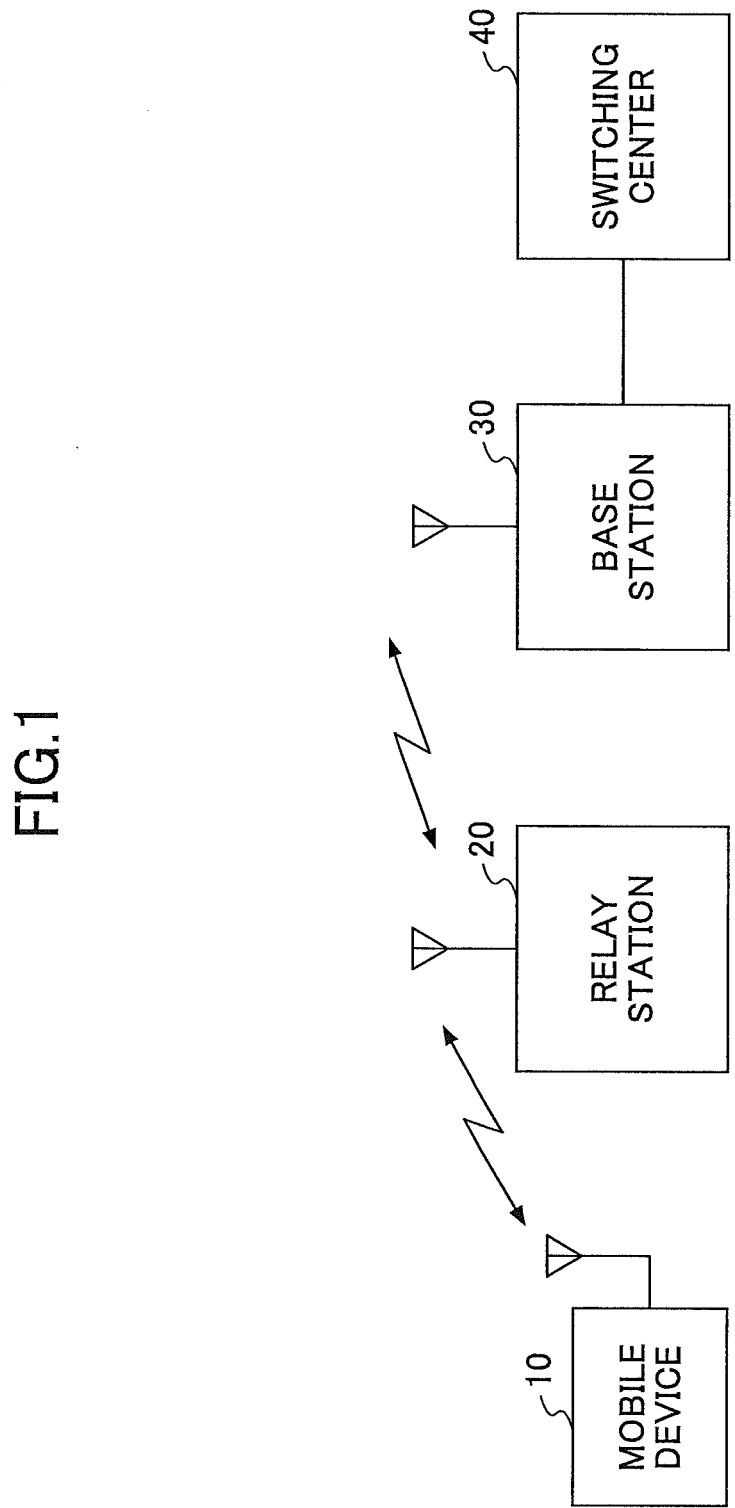
FIG. 1 is a drawing used to provide an overview of a relay technology.
Figure 2:
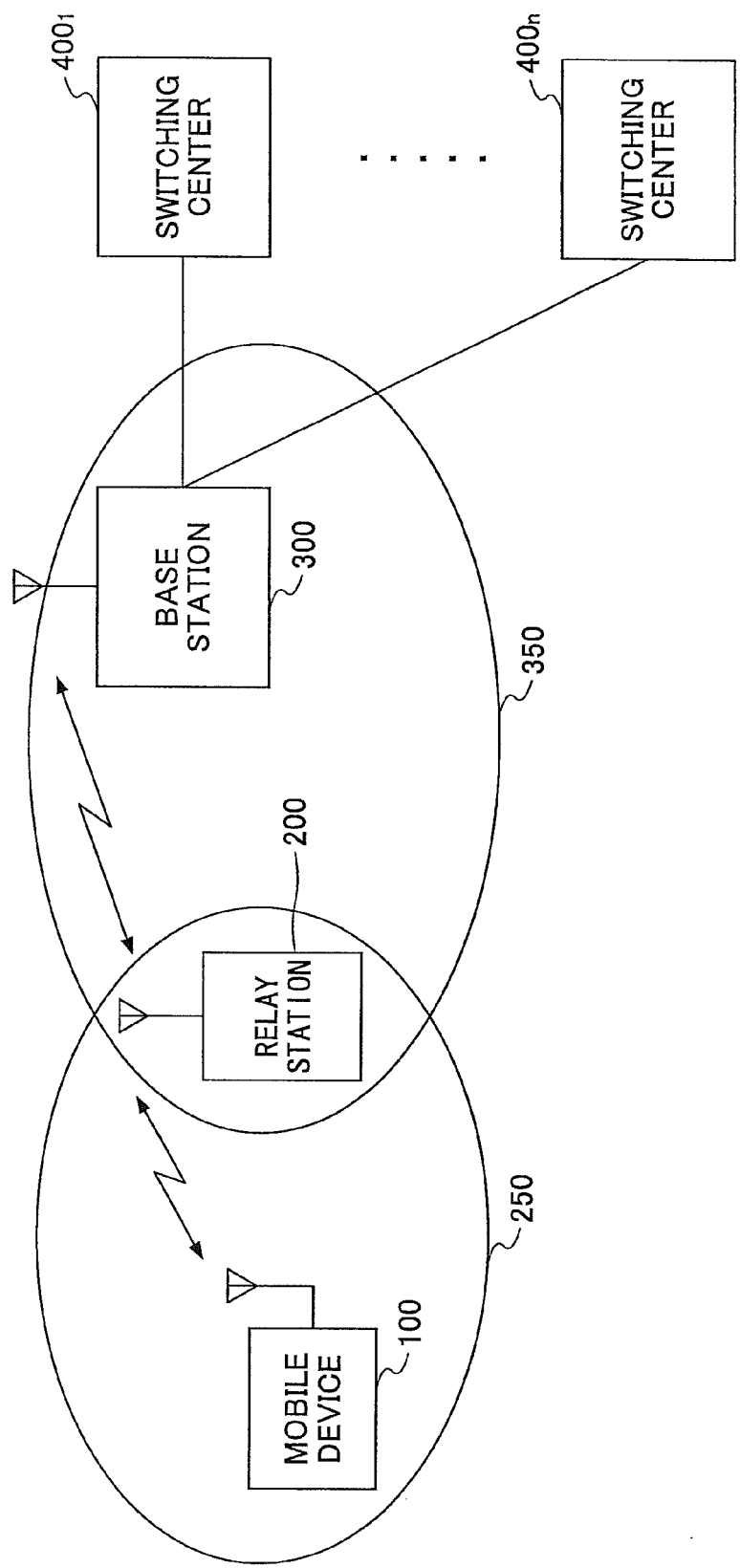
FIG. 2 is a drawing illustrating an exemplary system according to an embodiment.

FIG. 2 is a drawing illustrating an exemplary environment where a relay station and a base station of the present embodiment are used. FIG. 2 illustrates a base station 300 supporting LTE-Advanced and an area covered by the base station 300.

The area includes a cell 350 where the base station 300 can perform radio communications with mobile devices (or user equipment: UE). A relay station 200 is installed in the cell 350. The relay station 200 is preferably positioned at an edge of the area covered by the base station 300 to increase the coverage of the base station 300. That is, by installing the relay station 200 at an edge of the area covered by the base station 300, it is possible to expand the area where the base station 300 can perform radio communications.

The relay station 200 covers an area 250. A mobile device 100 is located in the area 250. The mobile device 100 can perform radio communications with the base station 300 via the relay station 200. The radio access link between the mobile device 100 and the relay station 200 may be referred to as "Uu". The radio backhaul link between the relay station 200 and the base station 300 may be referred to as "Un". The base station 300 connected to the relay station 200 may be referred to as donor eNodeB (DeNB). During a connection process with the base station 300, the relay station 200 transmits a message including information (which may be referred to as "relay station information") indicating that the sender is a relay station.

The base station 300 is connected to switching centers $400_n$ (n indicates an integer greater than 1). The switching centers $400_n$ are connected to a core network (not shown). The mobile device 100 communicates with the base station 300 according to LTE-Advanced. The base station 300 may be connected to the Evolved Packet Core (EPC). When the message from the relay station 200 includes relay station information, the base station 300 connects the relay station 200 to one of the switching centers $400_n$ supporting the relay station 200.

The switching centers $400_n$ include switching centers supporting (i.e., compatible with) the relay station 200 and switching centers not supporting (i.e., incompatible with) the relay station 200. Each of the switching centers $400_n$ may be implemented as a mobility management entity (MME). Also, each of the switching centers $400_n$ may be implemented as a combination of a serving gateway (SGW) and an MME (MME/S-GW). MME/S-GW may be referred to as an access gateway.

<Relay Station>

The relay station 200 demodulates and decodes a downlink signal from the base station 300. Also, the relay station 200 regenerates the downlink signal and wirelessly transmits the downlink signal again. For example, the relay station 200 may perform a ciphering process and a user data segmentation/concatenation process on the downlink signal. Then, the relay station 200 encodes and modulates the downlink signal and wirelessly transmits the downlink signal to the mobile device 100. The relay station 200 may be referred to as a relay node (RN).

Figure 3:
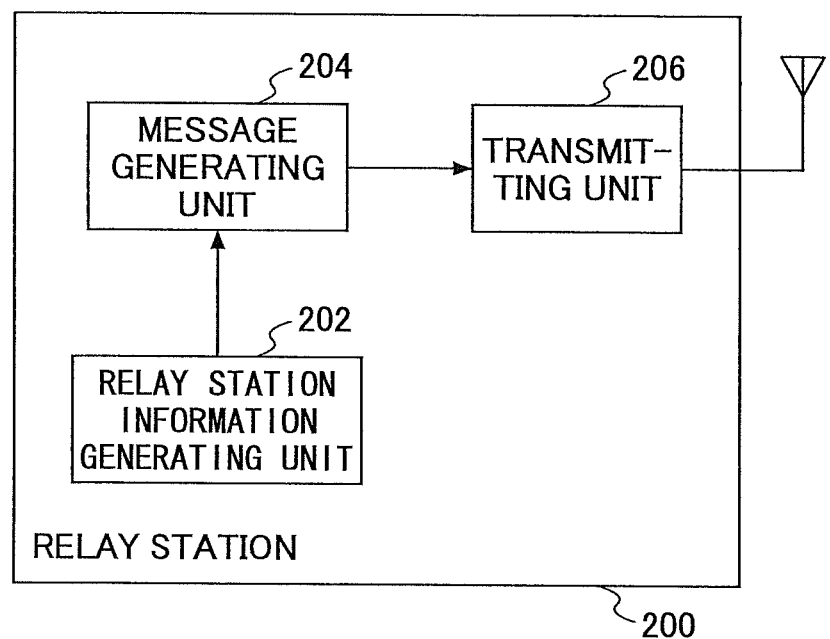
FIG. 3 is a block diagram illustrating an exemplary functional configuration of a relay station according to an embodiment.

FIG. 3 is a block diagram illustrating an exemplary functional configuration of the relay station 200.

The relay station 200 includes a relay station information generating unit 202. The relay station information generating unit 202 generates relay station information. For example, the relay station information generating unit 202 may generate relay station information to be included in a message indicating that a radio link has been established between the relay station 200 and the base station 300. More specifically, the message indicating that a radio link has been established between the relay station 200 and the base station 300 may be implemented by an "RRC Connection Setup Complete" signal. The relay station information generating unit 202 inputs the relay station information to a message generating unit 204.

The relay station 200 includes the message generating unit 204. The message generating unit 204 is connected to the relay station information generating unit 202. The message generating unit 204 generates a message to be transmitted to the base station 300 when a connection process is performed between the relay station 200 and the base station 300. For example, the message generating unit 204 generates a message indicating that a radio link has been established between the relay station 200 and the base station 300. More specifically, the message indicating that a radio link has been established between the relay station 200 and the base station 300 may be implemented by an "RRC Connection Setup Complete" signal. The message generating unit 204 includes the relay station information input from the relay station information generating unit 202 in the message indicating that a radio link has been established between the relay station 200 and the base station 300. For example, the relay station information may be included in an unused field of the "RRC Connection Setup Complete" signal. An example of the unused field is "non critical extension". The message generating unit 204 inputs the message to a transmitting unit 206.

The relay station 200 includes the transmitting unit 206. The transmitting unit 206 is connected to the message generating unit 204. The transmitting unit 206 wirelessly transmits a message input from the message generating unit 204 to the base station 300. For example, the transmitting unit 206 transmits a message input from the message generating unit 204 and indicating that a radio link has been established between the relay station 200 and the base station 300. The message includes the relay station information.

<Base Station>

The base station 300 determines, based on an uplink signal, whether the sender of the uplink signal is a relay station. When it is determined that the sender of the uplink signal is a relay station, the base station 300 selects a switching center supporting the relay station from switching centers that can be connected with the base station 300. The relay station is connected to the selected switching center.

Figure 4:
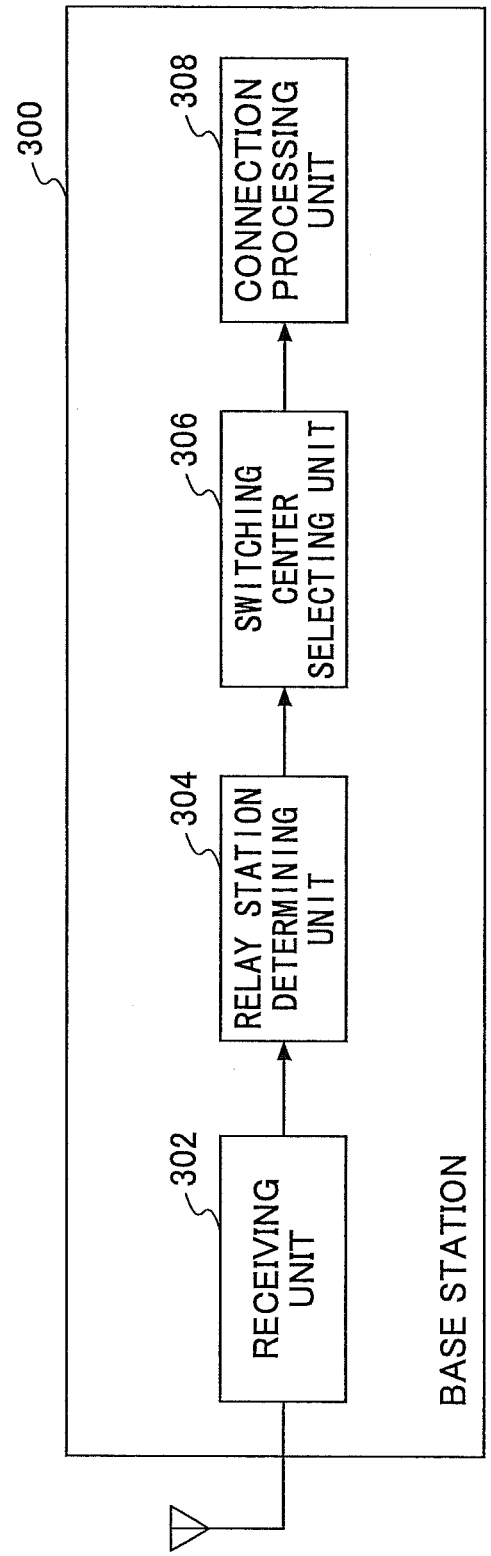
FIG. 4 is a block diagram illustrating an exemplary functional configuration of a base station according to an embodiment.

FIG. 4 is a block diagram illustrating an exemplary functional configuration of the base station 300.

The base station 300 includes a receiving unit 302. The receiving unit 302 receives an uplink signal. The uplink signal may be transmitted from the mobile device 300 or the relay station 200. The uplink signal may include a message. The receiving unit 302 inputs the received uplink signal to a relay station determining unit 304.

The base station 300 includes the relay station determining unit 304. The relay station determining unit 304 is connected to the receiving unit 302. The relay station determining unit 304 determines whether the input uplink signal includes relay station information. For example, when a message indicating that a radio link has been established between the relay station 200 and the base station 300 is input, the relay station determining unit 304 may determine whether the message includes relay station information. More specifically, when the message indicating that a radio link has been established between the relay station 200 and the base station 300 is an "RRC Connection Setup Complete" signal, the relay station determining unit 304 determines whether the "RRC Connection Setup Complete" signal includes relay station information. For example, the relay station determining unit 304 may determine whether the "non critical extension" field of the "RRC Connection Setup Complete" signal includes relay station information. The relay station determining unit 304 inputs the determination result indicating whether the uplink signal includes relay station information to a switching center selecting unit 306.

The base station 300 includes the switching center selecting unit 306. The switching center selecting unit 306 is connected to the relay station determining unit 304. The switching center selecting unit 306 selects a target switching center to be connected to the relay station 200 based on the determination result input from the relay station determining unit 304 and indicating whether the uplink signal includes relay station information. The switching center selecting unit 306 may determine that the uplink signal is a connection request from the relay station 200 when the determination result indicates that the uplink signal includes relay station information, and determine that the uplink signal is a connection request from the mobile device 300 when the determination result indicates that the uplink signal does not include relay station information. When the determination result indicates that the uplink signal includes relay station information, the switching center selecting unit 306 selects a switching center supporting the relay station 200 as a target switching center. Meanwhile, when the determination result indicates that the uplink signal does not include relay station information, the switching center selecting unit 306 selects either a switching center supporting the relay station 200 or a switching center not supporting the relay station 200 as a target switching center. Information indicating whether the switching centers $400_n$ support the relay station 200 may be set in the base station 300 in advance. For example, such information may be set in the base station 300 when the base station 300 or the switching centers $400_n$ are installed. Alternatively, the base station 300 may be configured to query the switching centers $400_n$ about whether they support the relay station 200 when a connection process is performed with the mobile device 100 or the relay station 200.

For example, the switching center selecting unit 306 may select a target switching center from switching centers supporting the relay station 200 based on the network topology such that the target switching center is not changed frequently. Alternatively, the switching center selecting unit 306 may be configured to select a target switching center from switching centers supporting the relay station 200 based on a load balancing scheme. The switching center selecting unit 306 inputs information indicating a target switching center to be connected with the relay station 200 to a connection processing unit 308.

The base station 300 includes the connection processing unit 308. The connection processing unit 308 is connected to the switching center selecting unit 306. Based on the information indicating the target switching center input from the switching center selecting unit 306, the connection processing unit 308 logically connects the target switching center and the relay station 200.

<System Operations>

Figure 5:
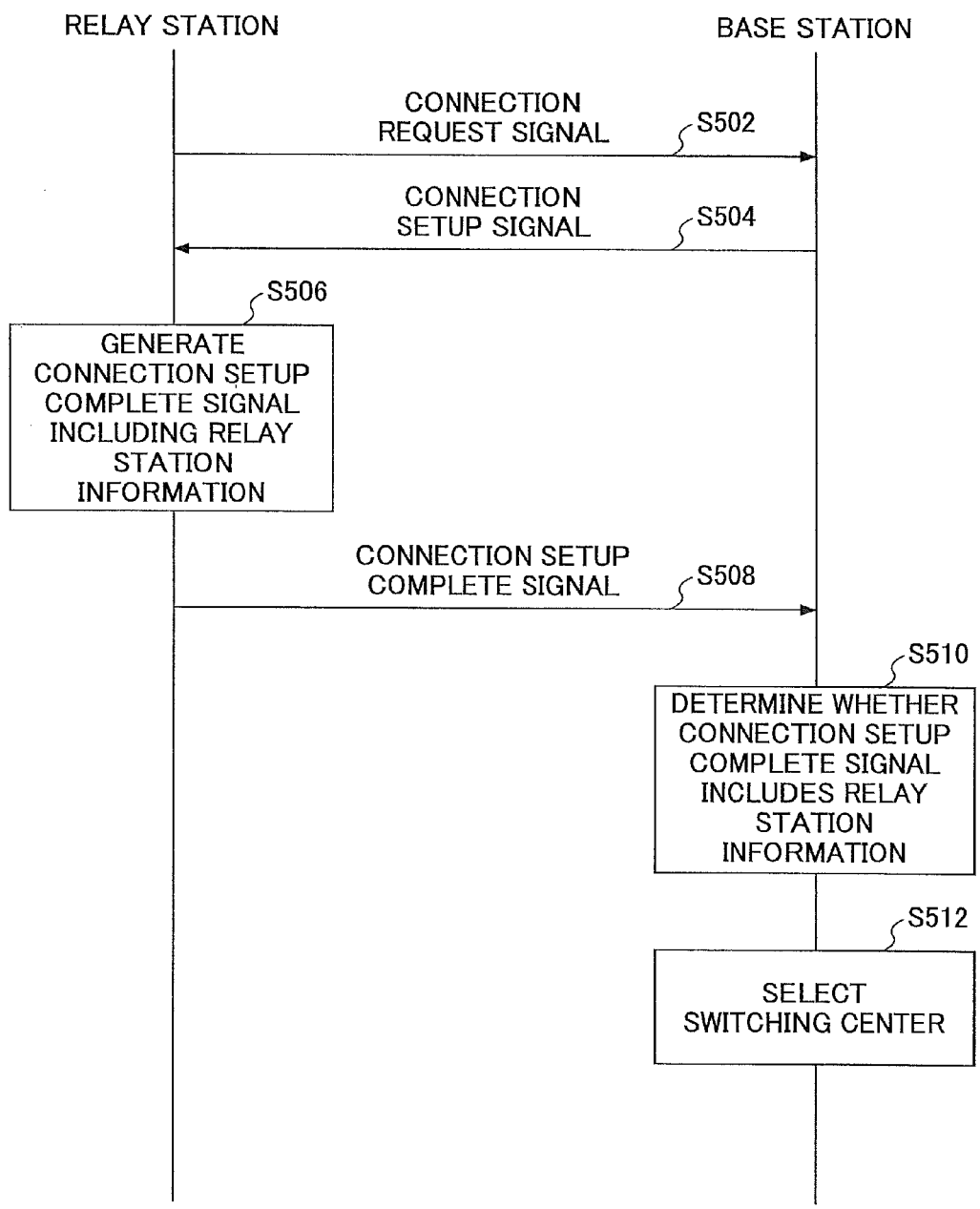
FIG. 5 is a sequence chart illustrating exemplary operations of a system according to an embodiment.

FIG. 5 is a sequence chart illustrating exemplary operations of the system according to the present embodiment.

In FIG. 5, the relay station 200 wirelessly transmits a connection request signal (RRC connection request) to the base station 300 (step S502).

Based on the connection request signal from the relay station 200, the base station 300 generates a connection setup signal (RRC connection setup) and wirelessly transmits the connection setup signal to the relay station 200 (step S504).

In response to the connection setup signal from the base station 300, the relay station 200 makes connection settings. Then, the relay station 200 generates a connection setup complete signal (RRC connection setup complete) including relay station information (step S506). For example, the relay station information generating unit 202 generates relay station information, and the message generating unit 204 generates a connection setup complete signal including the relay station information generated by the relay station information generating unit 202.

The relay station 200 wirelessly transmits the connection setup complete signal including the relay station information to the base station 300 (step S508). For example, the transmitting unit 206 wirelessly transmits the connection setup complete signal generated by the message generating unit 204 to the base station 300.

The base station 300 determines whether the connection setup complete signal from the relay station 200 includes relay station information (step S510). For example, the relay station determining unit 304 determines whether the connection setup complete signal input from the receiving unit 302 includes relay station information.

Based on the determination result at step S510, the base station 300 selects a target switching center to which the relay station 200 or the mobile device 100 is to be connected (step S512). For example, when the determination result input from the relay station determining unit 304 indicates that the connection setup complete signal includes relay station information, the switching center selecting unit 306 selects switching centers supporting the relay station 200 from the switching centers $400_n$ and selects a target switching center to which the relay station 200 is to be connected from the switching centers supporting the relay station 200. For example, the switching center selecting unit 306 may select the target switching center from the switching centers supporting the relay station 200 based on the network topology such that the target switching center is not changed frequently. Alternatively, the switching center selecting unit 306 may select the target switching center from the switching centers supporting the relay station 200 based on a load balancing scheme.

The base station 300 connects the relay station 200 and the target switching center. For example, the connection processing unit 308 logically connects the target switching center selected at step S510 and the relay station 200.

According to the present embodiment, since a connection setup complete signal including relay station information is wirelessly transmitted from a relay station to a base station, the base station can determine that a connection process is being performed with the relay station. This in turn enables the base station to select a target switching center to be connected to the relay station from switching centers supporting the relay station.

The connection setup complete signal may be transmitted via a dedicated control channel. Using a dedicated control channel makes it possible to secure a large number of bits for relay station information and thereby improve the scalability.

<<Variation>>

<System>

An environment where a relay station and a base station according to a variation of the present embodiment are used is substantially the same as the environment described above with reference to FIG. 2.

A relay station 200 of this variation is connected to an operation, administration and maintenance (OAM) entity when the relay station 200 is attached to a network. The relay station 200 downloads setting information from the OAM entity. The setting information includes initial setting information and setting information for operations peculiar to a relay station. The initial setting information may include, for example, information used to set a link between the relay station 200 and the base station 300. After downloading the setting information, the relay station 200 disconnects communication with the OAM entity. According to this variation, the setting information includes information (target switching center information) indicating a target switching center to be connected to the relay station 200. For example, the target switching center may be set by a non-access stratum (NAS) layer when the relay station 200 is attached to the network. For example, the target switching center may be set in "registered MME".

During a connection process with the base station 300, the relay station 200 transmits a message including the target switching center information.

When the message from the relay station 200 includes target switching center information, the base station 300 connects the relay station 200 to a switching center indicated by the target switching center information.

<Relay Station>

The relay station 200 demodulates and decodes a downlink signal from the base station 300. Also, the relay station 200 regenerates the downlink signal and wirelessly transmits the downlink signal again. For example, the relay station 200 may perform a ciphering process and a user data segmentation/concatenation process on the downlink signal. Then, the relay station 200 encodes and modulates the downlink signal and wirelessly transmits the downlink signal to the mobile device 100.

Figure 6:
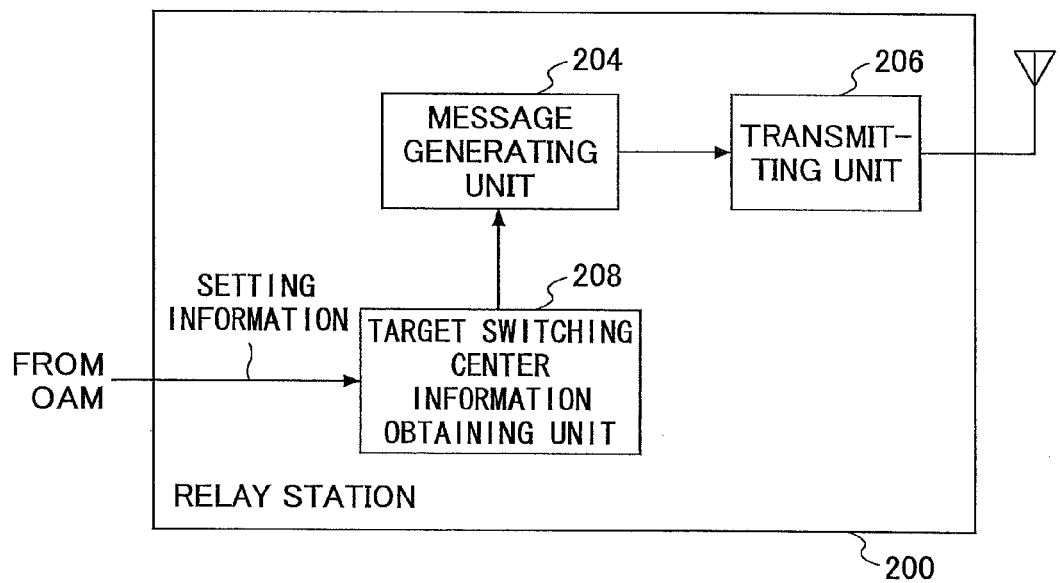
FIG. 6 is a functional block diagram illustrating another exemplary configuration of a relay station according to an embodiment.

FIG. 6 is a block diagram illustrating an exemplary functional configuration of the relay station 200 of this variation.

The relay station 200 includes a target switching center information obtaining unit 208. The target switching center information obtaining unit 208 receives setting information from the OAM entity. The target switching center information obtaining unit 208 determines whether the setting information received from the OAM entity includes target switching center information. When target switching center information is included in the setting information, the target switching center information obtaining unit 208 obtains the target switching center information. Then, the target switching center information obtaining unit 208 inputs the target switching center information obtained from the setting information to the message generating unit 204.

The relay station 200 includes a message generating unit 204. The message generating unit 204 is connected to the target switching center information obtaining unit 208. The message generating unit 204 generates a message to be transmitted to the base station 300 when a connection process is performed between the relay station 200 and the base station 300. For example, the message generating unit 204 generates a message indicating that a radio link has been established between the relay station 200 and the base station 300. More specifically, the message indicating that a radio link has been established between the relay station 200 and the base station 300 may be implemented by an "RRC Connection Setup Complete" signal. The message generating unit 204 includes the target switching center information input from the target switching center information obtaining unit 208 in the message indicating that a radio link has been established between the relay station 200 and the base station 300. For example, the target switching center information may be set in "registered MME" in the "RRC Connection Setup Complete" signal. The message generating unit 204 inputs the message to a transmitting unit 206.

The relay station 200 includes the transmitting unit 206. The transmitting unit 206 is connected to the message generating unit 204. The transmitting unit 206 wirelessly transmits the message input from the message generating unit 204 to the base station 300. For example, the transmitting unit 206 transmits a message input from the message generating unit 204 and indicating that a radio link has been established between the relay station 200 and the base station 300. The message includes the target switching center information. According to this variation, since the target switching center information is included in the RRC Connection Setup Complete message, the base station 300 can reliably select a switching center that is capable of controlling the relay station 200.

<Base Station>

The base station 300 selects a switching center specified by an uplink signal.

Figure 7:
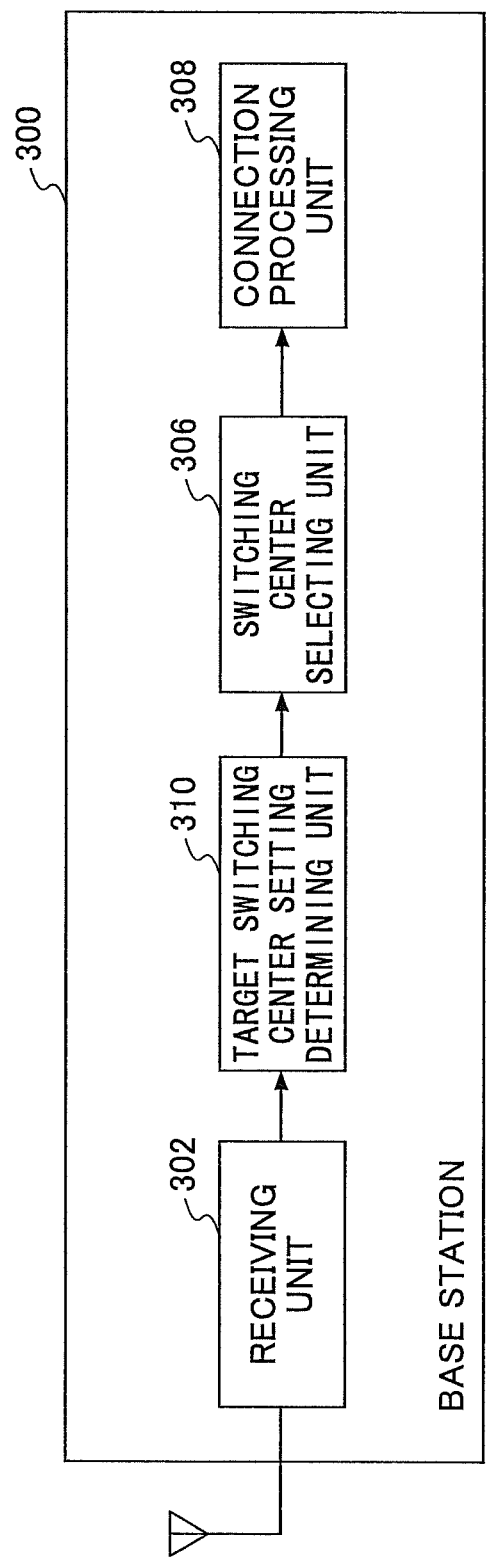
FIG. 7 is a block diagram illustrating another exemplary functional configuration of a base station according to an embodiment.

FIG. 7 is a block diagram illustrating an exemplary functional configuration of the base station 300 according to the variation.

The base station 300 includes a receiving unit 302. The receiving unit receives an uplink signal. The uplink signal may be transmitted from the mobile device 300 or the relay station 200. The receiving unit 302 inputs the received uplink signal to a target switching center setting determining unit 310.

The base station 300 includes the target switching center setting determining unit 310. The target switching center setting determining unit 310 is connected to the receiving unit 302. The target switching center setting determining unit 310 determines whether a target switching center is set in the input uplink signal. For example, the target switching center setting determining unit 310 may determine whether a target switching center is set in a message indicating that a radio link has been established between the relay station 200 and the base station 300. More specifically, when the message indicating that a radio link has been established between the relay station 200 and the base station 300 is an "RRC Connection Setup Complete" signal, the target switching center setting determining unit 310 determines whether a target switching center is set in the "RRC Connection Setup Complete" signal. For example, the target switching center setting determining unit 310 may determine whether a target switching center is set in "registered MME". The target switching center setting determining unit 310 inputs a determination result indicating whether a target switching center is set in the input uplink signal to a switching center selecting unit 306.

The base station 300 includes the switching center selecting unit 306. The switching center selecting unit 306 is connected to the target switching center setting determining unit 310. The switching center selecting unit 306 selects a switching center to be connected with the relay station 200 based on the determination result input from the target switching center setting determining unit 310 and indicating whether a target switching center is set in the uplink signal. When the determination result indicates that a target switching center is set in the uplink signal, the switching center selecting unit 306 selects the switching center indicated by target switching center information. Meanwhile, when the determination result indicates that no target switching center is set in the uplink signal, the switching center selecting unit 306 selects either a switching center supporting the relay station 200 or a switching center not supporting the relay station 200 as a target switching center.

For example, the switching center selecting unit 306 may select a target switching center from switching centers supporting the relay station 200 based on the network topology such that the target switching center is not changed frequently. Alternatively, the switching center selecting unit 306 may be configured to select a switching center from switching centers supporting the relay station 200 based on a load balancing scheme. The switching center selecting unit 306 inputs information indicating a target switching center to be connected with the relay station 200 to a connection processing unit 308.

The base station 300 includes the connection processing unit 308. The connection processing unit 308 is connected to the switching center selecting unit 306. Based on the information indicating the target switching center input from the switching center selecting unit 306, the connection processing unit 308 logically connects the target switching center and the relay station 200.

<System Operations>

Figure 8:
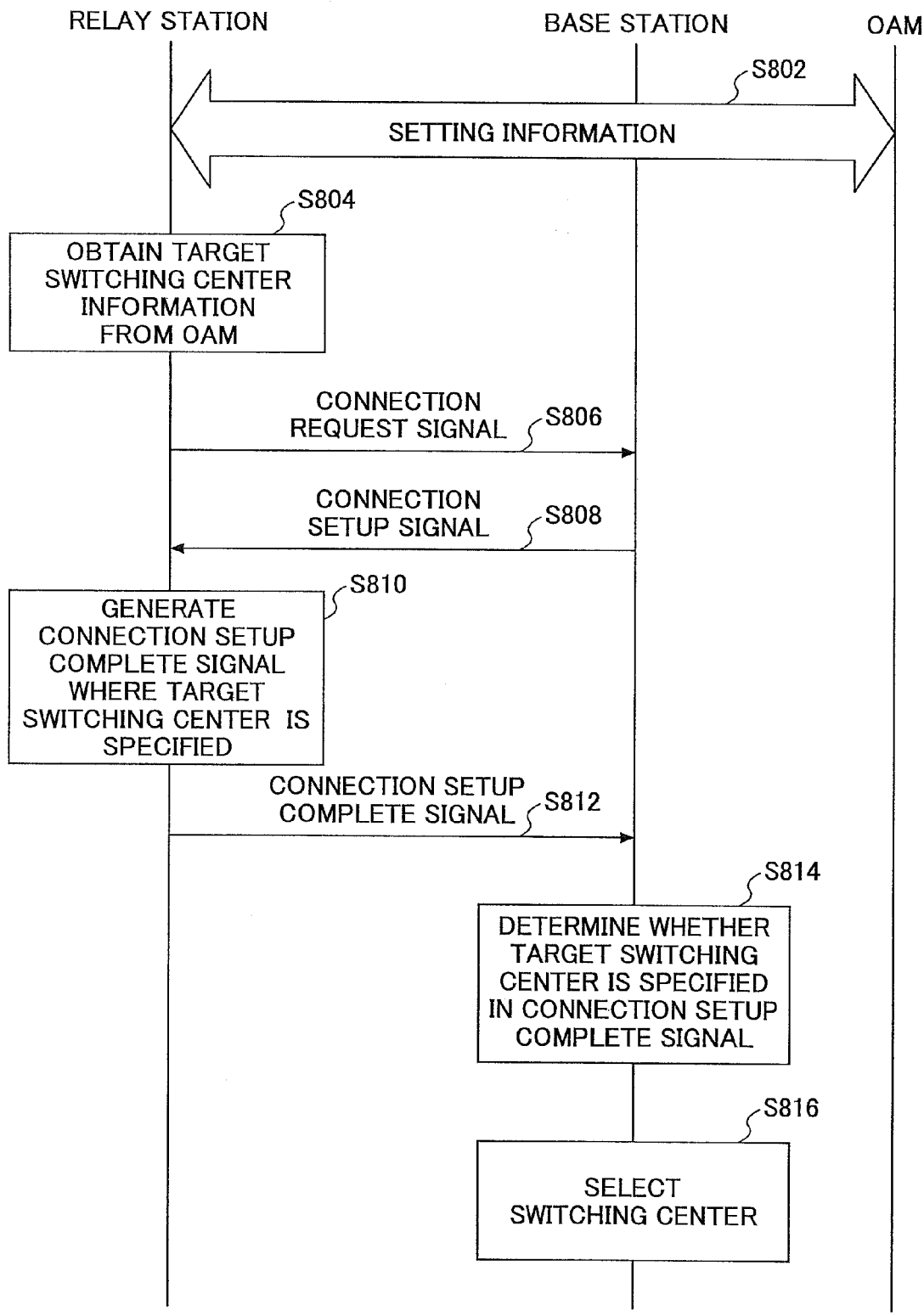
FIG. 8 is a sequence chart illustrating other exemplary operations of a system according to an embodiment.

FIG. 8 is a sequence chart illustrating exemplary operations of the system according to the variation.

The relay station 200 connects to an operation, administration and maintenance (OAM) entity before being attached to a network (step S802). At the OAM entity, a target switching center is set in "registered MME" by the NAS layer.

The relay station 200 downloads setting information from the OAM entity. The setting information includes default setting information and setting information for operations peculiar to a relay station. After downloading the setting information, the relay station 200 disconnects communication with the OAM entity.

Then, the relay station 200 determines whether a target switching center is set in the setting information received from the OAM entity. When a target switching center is set in the setting information, the relay station 200 obtains target switching center information indicating the target switching center (step S804). For example, the target switching center information obtaining unit 208 obtains target switching center information from the setting information.

Next, the relay station 200 wirelessly transmits a connection request signal to the base station 300 (step S806).

Based on the connection request signal from the relay station 200, the base station 300 generates a connection setup signal and wirelessly transmits the connection setup signal to the relay station 200 (step S808).

In response to the connection setup signal from the base station 300, the relay station 200 makes connection settings. Next, the relay station 200 generates a connection setup complete signal where the target switching center is set (step S810). For example, the message generating unit 204 generates a connection setup complete signal including the target switching center information obtained by the target switching center information obtaining unit 208.

The relay station 200 wirelessly transmits the connection setup complete signal where the target switching center is set to the base station 300 (step S812). For example, the transmitting unit 206 wirelessly transmits the connection setup complete signal generated by the message generating unit 204 to the base station 300.

The base station 300 determines whether a target switching center is set (or specified) in the connection setup complete signal from the relay station 200 (step S814). For example, the target switching center setting determining unit 310 determines whether a target switching center is set in the connection setup complete signal input from the receiving unit 302.

Based on the determination result at step S814, the base station 300 selects a target switching center to which the relay station 200 or the mobile device 100 is to be connected (step S816). For example, when a determination result input from the target switching center setting determining unit 310 indicates that a target switching center is set in the connection setup complete signal, the switching center selecting unit 306 selects the target switching center set in the connection setup complete signal. Meanwhile, when the determination result indicates that no target switching center is set in the connection setup complete signal, the switching center selecting unit 306 selects either a switching center supporting the relay station 200 or a switching center not supporting the relay station 200 as a target switching center.

The base station 300 logically connects the relay station 200 and the selected target switching center.

According to this variation, since a connection setup complete signal including target switching center information specified by the OAM entity is wirelessly transmitted from a relay station to a base station, the base station can connect the relay station with a target switching center indicated by the target switching center information. With this configuration, since a target switching center is specified by the OAM entity, the base station does not need to select a target switching center from switching centers supporting the relay station.

An aspect of this disclosure provides a relay station for relaying a radio signal between a mobile station and a base station. The relay station includes a relay station information generating unit configured to generate relay station information used by the base station to select a switching center to be connected to the relay station; a message generating unit configured to generate a message including the relay station information generated by the relay station information generating unit; and a transmitting unit configured to transmit the message generated by the message generating unit to the base station.

The message generating unit may be configured to generate a connection setup complete signal including the relay station information generated by the relay station information generating unit.

Another aspect of this disclosure provides a base station for receiving a radio signal from a relay station relaying the radio signal. The base station includes a receiving unit configured to receive a wirelessly-transmitted message; a relay station information determining unit configured to determine whether the message received by the receiving unit includes relay station information used by the base station to select a switching center to be connected to the relay station; a switching center selecting unit configured to select the switching center to be connected to the relay station from switching centers that are compatible with the relay station when the relay station information determining unit determines that the message includes the relay station information; and a connection processing unit configured to connect the switching center selected by the switching center selecting unit to the relay station.

The receiving unit may be configured to receive a connection setup complete signal, and the relay station information determining unit may be configured to determine whether the connection setup complete signal received by the receiving unit includes the relay station information.

Another aspect of this disclosure provides a radio communication system that includes a base station and a relay station configured to relay a radio signal between the base station and a mobile station. The relay station includes a relay station information generating unit configured to generate relay station information used by the base station to select a switching center to be connected to the relay station, a message generating unit configured to generate a message including the relay station information generated by the relay station information generating unit, and a transmitting unit configured to transmit the message generated by the message generating unit to the base station. The base station includes a receiving unit configured to receive a wirelessly-transmitted message, a relay station information determining unit configured to determine whether the message received by the receiving unit includes the relay station information, a switching center selecting unit configured to select the switching center to be connected to the relay station from switching centers that are compatible with the relay station when the relay station information determining unit determines that the message includes the relay station information, and a connection processing unit configured to connect the switching center selected by the switching center selecting unit to the relay station.

Another aspect of this disclosure provides a method for a radio communication system including a base station and a relay station that relays a radio signal between the base station and a mobile station. The method includes a relay station information generating step of generating, by the relay station, relay station information used by the base station to select a switching center to be connected to the relay station; a message generating step of generating, by the relay station, a message including the relay station information generated in the relay station information generating step; a transmitting step of transmitting, by the relay station, the message generated in the message generating step to the base station; a receiving step of receiving, by the base station, a wirelessly-transmitted message; a relay station information determining step of determining, by the base station, whether the message received in the receiving step includes the relay station information; a switching center selecting step of selecting, by the base station, the switching center to be connected to the relay station from switching centers that are compatible with the relay station when it is determined in the relay station information determining step that the message includes the relay station information; and a connection processing step of connecting, by the base station, the switching center selected in the switching center selecting step to the relay station.

Another aspect of this disclosure provides a relay station for relaying a radio signal between a mobile station and a base station. The relay station includes a target switching center information obtaining unit configured to obtain target switching center information indicating a switching center to be connected to the relay station from a network; a message generating unit configured to generate a message where the switching center indicated by the target switching center information obtained by the target switching center information obtaining unit is specified; and a transmitting unit configured to transmit the message generated by the message generating unit to the base station.

The message generating unit may be configured to generate a connection setup complete signal where the switching center indicated by the target switching center information obtained by the target switching center information obtaining unit is specified.

Another aspect of this disclosure provides a base station for receiving a radio signal from a relay station relaying the radio signal. The base station includes a receiving unit configured to receive a wirelessly-transmitted message; a target switching center setting determining unit configured to determine whether a switching center to be connected to the relay station is specified in the message received by the receiving unit; a switching center selecting unit configured to select the switching center specified in the message when the target switching center setting determining unit determines that the switching center to be connected to the relay station is specified in the message; and a connection processing unit configured to connect the switching center selected by the switching center selecting unit to the relay station.

The receiving unit may be configured to receive a connection setup complete signal; and the target switching center setting determining unit may be configured to determine whether the switching center to be connected to the relay station is specified in the connection setup complete signal received by the receiving unit.

Another aspect of this disclosure provides a radio communication system that includes a base station and a relay station configured to relay a radio signal between the base station and a mobile station. The relay station includes a target switching center information obtaining unit configured to obtain target switching center information indicating a switching center to be connected to the relay station from a network, a message generating unit configured to generate a message where the switching center indicated by the target switching center information obtained by the target switching center information obtaining unit is specified, and a transmitting unit configured to transmit the message generated by the message generating unit to the base station. The base station includes a receiving unit configured to receive a wirelessly-transmitted message, a target switching center setting determining unit configured to determine whether a switching center to be connected to the relay station is specified in the message received by the receiving unit, a switching center selecting unit configured to select the switching center specified in the message when the target switching center setting determining unit determines that the switching center to be connected to the relay station is specified in the message, and a connection processing unit configured to connect the switching center selected by the switching center selecting unit to the relay station.

Still another aspect of this disclosure provides a method for a radio communication system including a base station and a relay station that relays a radio signal between the base station and a mobile station. The method includes a target switching center information obtaining step of obtaining, by the relay station, target switching center information indicating a switching center to be connected to the relay station from a network; a message generating step of generating, by the relay station, a message where the switching center indicated by the target switching center information obtained in the target switching center information obtaining step is specified; a transmitting step of transmitting, by the relay station, the message generated in the message generating step to the base station; a receiving step of receiving, by the base station, a wirelessly-transmitted message; a target switching center setting determining step of determining, by the base station, whether the switching center to be connected to the relay station is specified in the message received in the receiving step; a switching center selecting step of selecting, by the base station, the switching center specified in the message when it is determined in the target switching center setting determining step that the switching center to be connected to the relay station is specified in the message; and a connection processing step of connecting, by the base station, the switching center selected in the switching center selecting step to the relay station.

Although specific values are used in the above descriptions to facilitate the understanding of one or more embodiments of the present invention, the values are just examples and other appropriate values may also be used unless otherwise mentioned.

The above described embodiments are just examples, and a person skilled in the art may understand that variations and modifications may be made to the above described embodiments. Although functional block diagrams are used to describe apparatuses in the above embodiments, the apparatuses may be implemented by hardware, software, or a combination of them. The present invention is not limited to the specifically disclosed embodiments, and variations and modifications may be made without departing from the scope of the present invention.

The present international application claims priority from Japanese Patent Application No. 2010-226798 filed on Oct. 6, 2010, the entire contents of which are hereby incorporated herein by reference.

EXPLANATION OF REFERENCES

10 Mobile device
20 Relay station
30 Base station
40 Switching center
100 Mobile device
200 Relay station
202 Relay station information generating unit
204 Message generating unit
206 Transmitting unit
208 Target switching center information obtaining unit
250 Cell covered by relay station
300 Base station
302 Receiving unit
304 Relay station determining unit
306 Switching center selecting unit
308 Connection processing unit
310 Target switching center setting determining unit
350 Cell covered by base station
400$_n$ (n is an integer greater than 1) Switching centers

The invention claimed is:

1. A relay station for relaying a radio signal between a mobile station and a base station, the relay station comprising:
   a relay station information generating unit configured to generate relay station information used by the base station to select a switching center to be connected to the relay station;
   a message generating unit configured to generate a connection setup complete signal including the relay station information generated by the relay station information generating unit; and
   a transmitting unit configured to transmit the connection setup complete signal generated by the message generating unit to the base station,
   wherein the message generating unit is configured to include the relay station information in a non critical extension of the connection setup complete signal; and
   wherein at the base station, the switching center to be connected to the relay station is selected based on whether the relay station information is included in the non critical extension of the connection setup complete signal.

2. A base station for receiving a radio signal from a relay station relaying the radio signal, the base station comprising:
   a receiving unit configured to receive a connection setup complete signal from the relay station;
   a relay station information determining unit configured to determine whether the connection setup complete signal received by the receiving unit includes relay station information used by the base station to select a switching center to be connected to the relay station;
   a switching center selecting unit configured to select the switching center to be connected to the relay station from switching centers that are compatible with the relay station when the relay station information determining unit determines that the connection setup complete signal includes the relay station information; and
   a connection processing unit configured to connect the switching center selected by the switching center selecting unit to the relay station,
   wherein the relay station information determining unit is configured to determine whether the relay station information is included in a non critical extension of the connection setup complete signal.

3. A radio communication system, comprising:
   a base station; and
   a relay station configured to relay a radio signal between the base station and a mobile station,
   wherein the relay station comprises:
      a relay station information generating unit configured to generate relay station information used by the base station to select a switching center to be connected to the relay station,
      a message generating unit configured to generate a connection setup complete signal including the relay station information generated by the relay station information generating unit, and
      a transmitting unit configured to transmit the connection setup complete signal generated by the message generating unit to the base station,
      wherein the message generating unit is configured to include the relay station information in a non critical extension of the connection setup complete signal;
   wherein the base station comprises:
      a receiving unit configured to receive the connection setup complete signal from the relay station,
      a relay station information determining unit configured to determine whether the connection setup complete signal received by the receiving unit includes the relay station information,
      a switching center selecting unit configured to select the switching center to be connected to the relay station from switching centers that are compatible with the relay station when the relay station information determining unit determines that the connection setup complete signal includes the relay station information, and
      a connection processing unit configured to connect the switching center selected by the switching center selecting unit to the relay station,
      wherein the relay station information determining unit is configured to determine whether the relay station information is included in the non critical extension of the connection setup complete signal.

4. A method for a radio communication system including a base station and a relay station that relays a radio signal between the base station and a mobile station, the method comprising:
   a relay station information generating step of generating, by the relay station, relay station information used by the base station to select a switching center to be connected to the relay station;
   a message generating step of generating, by the relay station, a connection setup complete signal including the relay station information generated in the relay station information generating step;
   a transmitting step of transmitting, by the relay station, the connection setup complete signal generated in the message generating step to the base station,
   wherein in the message generating step, the relay station information is included in a non critical extension of the connection setup complete signal;
   a receiving step of receiving, by the base station, the connection setup complete signal from the relay station;
   a relay station information determining step of determining, by the base station, whether the connection setup complete signal received in the receiving step includes the relay station information;

a switching center selecting step of selecting, by the base station, the switching center to be connected to the relay station from switching centers that are compatible with the relay station when it is determined in the relay station information determining step that the connection setup complete signal includes the relay station information; and a connection processing step of connecting, by the base station, the switching center selected in the switching center selecting step to the relay station, wherein in the relay station information determining step, whether the relay station information is included in the non critical extension of the connection setup complete signal is determined.

5. A relay station for relaying a radio signal between a mobile station and a base station, the relay station comprising:

a target switching center information obtaining unit configured to determine whether setting information received from a network includes target switching center information indicating a switching center to be connected to the relay station and obtain the target switching center information when the target switching center information is included in the setting information;

a message generating unit configured to generate a connection setup complete signal and specify the switching center indicated by the target switching center information in the generated connection setup complete signal when the target switching center information is obtained by the target switching center information obtaining unit; and a transmitting unit configured to transmit the connection setup complete signal generated by the message generating unit to the base station, wherein when determining that the switching center to be connected to the relay station is not specified in the connection setup complete signal, the base station selects a switching center that is compatible with the relay station.

6. A base station for receiving a radio signal from a relay station relaying the radio signal, the base station comprising:

a receiving unit configured to receive a connection setup complete signal from the relay station;

a target switching center setting determining unit configured to determine whether a switching center to be connected to the relay station is specified in the connection setup complete signal received by the receiving unit;

a switching center selecting unit configured to:
  select the switching center specified in the connection setup complete signal when the target switching center setting determining unit determines that the switching center to be connected to the relay station is specified in the connection setup complete signal, and
  select a switching center that is compatible with the relay station when the target switching center setting determining unit determines that the switching center to be connected to the relay station is not specified in the connection setup complete signal; and a connection processing unit configured to connect the switching center selected by the switching center selecting unit to the relay station.

7. A radio communication system, comprising:
a base station; and
a relay station configured to relay a radio signal between the base station and a mobile station, wherein the relay station comprises:
  a target switching center information obtaining unit configured to determine whether setting information received from a network includes target switching center information indicating a switching center to be connected to the relay station and obtain the target switching center information when the target switching center information is included in the setting information,
  a message generating unit configured to generate a connection setup complete signal and specify the switching center indicated by the target switching center information in the generated connection setup complete signal when the target switching center information is obtained by the target switching center information obtaining unit, and
  a transmitting unit configured to transmit the connection setup complete signal generated by the message generating unit to the base station;

wherein the base station comprises:
  a receiving unit configured to receive the connection setup complete signal from the relay station,
  a target switching center setting determining unit configured to determine whether the switching center to be connected to the relay station is specified in the connection setup complete signal received by the receiving unit,
  a switching center selecting unit configured to:
    select the switching center specified in the connection setup complete signal when the target switching center setting determining unit determines that the switching center to be connected to the relay station is specified in the connection setup complete signal, and
    select a switching center that is compatible with the relay station when the target switching center setting determining unit determines that the switching center to be connected to the relay station is not specified in the connection setup complete signal, and
  a connection processing unit configured to connect the switching center selected by the switching center selecting unit to the relay station.

8. A method for a radio communication system including a base station and a relay station that relays a radio signal between the base station and a mobile station, the method comprising:

a target switching center information determining step of determining, by the relay station, whether setting information received from a network includes target switching center information indicating a switching center to be connected to the relay station and obtaining the target switching center information when the target switching center information is included in the setting information;

a message generating step of generating, by the relay station, a connection setup complete signal and specifying the switching center indicated by the target switching center information in the generated connection setup complete signal when the target switching center information is obtained in the target switching center information obtaining step;

a transmitting step of transmitting, by the relay station, the connection setup complete signal generated in the message generating step to the base station;

a receiving step of receiving, by the base station, the connection setup complete signal from the relay station;

a target switching center setting determining step of determining, by the base station, whether the switching center to be connected to the relay station is specified in the connection setup complete signal received in the receiving step;

a switching center selecting steps of:
  selecting, by the base station, the switching center specified in the connection setup complete signal when it is determined in the target switching center setting determining step that the switching center to be connected to the relay station is specified in the connection setup complete signal, and
  selecting, by the base station, a switching center that is compatible with the relay station when it is determined in the target switching center setting determining step that the switching center to be connected to the relay station is not specified in the connection setup complete signal; and a connection processing step of connecting, by the base station, the switching center selected in the switching center selecting step to the relay station.

* * * * *